US011952809B2

(12) United States Patent
Och et al.

(10) Patent No.: US 11,952,809 B2
(45) Date of Patent: Apr. 9, 2024

(54) ACTUATING DEVICE FOR A LOCK OF A VEHICLE, AND VEHICLE DOOR AND VEHICLE HAVING SAID VEHICLE DOOR

(71) Applicant: ILLINOIS TOOL WORKS INC., Glenview, IL (US)

(72) Inventors: Roland Och, Rottendorf (DE); Joachim Oberst, Grossrinderfeld (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 211 days.

(21) Appl. No.: 17/422,285

(22) PCT Filed: Jan. 13, 2020

(86) PCT No.: PCT/US2020/013268
§ 371 (c)(1),
(2) Date: Jul. 12, 2021

(87) PCT Pub. No.: WO2020/154118
PCT Pub. Date: Jul. 30, 2020

(65) Prior Publication Data

US 2022/0081942 A1 Mar. 17, 2022

(30) Foreign Application Priority Data

Jan. 22, 2019 (EP) .................................... 19153166
Oct. 31, 2019 (DE) ..................... 10 2019 129 423.1

(51) Int. Cl.
*E05B 81/90* (2014.01)
*E05B 77/02* (2014.01)
(Continued)

(52) U.S. Cl.
CPC .............. *E05B 81/90* (2013.01); *E05B 77/02* (2013.01); *E05B 79/20* (2013.01); *E05B 83/36* (2013.01); *E05B 85/107* (2013.01)

(58) Field of Classification Search
CPC ........ E05B 85/00; E05B 85/003; E05B 85/10; E05B 85/107; E05B 81/90;
(Continued)

(56) References Cited

U.S. PATENT DOCUMENTS 3,544,148 A * 12/1970 Sandor .................... E05B 85/14 292/336.3
6,835,083 B1 * 12/2004 Alacqua .................. E05B 79/20 310/307
(Continued)

FOREIGN PATENT DOCUMENTS

CN 104265098 A 1/2015
CN 105874135 A 8/2016
(Continued)

OTHER PUBLICATIONS

Machine translation for WO2018024405A1 (Year: 2018).*
(Continued)

*Primary Examiner* — Christine M Mills
*Assistant Examiner* — Christopher F Callahan
(74) *Attorney, Agent, or Firm* — THOMPSON HINE LLP

(57) ABSTRACT

An actuating device (1) for a lock of a vehicle, which is arranged, or can be arranged, on a vehicle, wherein the actuating device (1) has an actuating component (10), which is to be grasped manually and which can be brought from a stowed position into a standby position, wherein the stowed position is a position in which the actuating component (10) to be grasped is stowed and wherein the standby position is a position in which the actuating component can be grasped by a user, wherein the actuating component (10) is operatively connected, or can be operatively connected, to at least the lock of the vehicle in such a way that the lock can be opened by actuating the actuating component. A vehicle
(Continued)

1 door having such an actuating device and a vehicle having such a vehicle door are also contemplated.

17 Claims, 4 Drawing Sheets

(51) Int. Cl.
*E05B 79/20* (2014.01)
*E05B 83/36* (2014.01)
*E05B 85/10* (2014.01)

(58) Field of Classification Search
CPC ...... E05B 81/0092; E05B 77/02; E05B 79/20; Y10T 292/57; Y10S 292/65
See application file for complete search history.

(56) References Cited

U.S. PATENT DOCUMENTS 8,317,237 B1 * 11/2012 Fannon .................... E05B 79/20 292/336.5
9,227,558 B2 * 1/2016 Spence .................... G07C 9/20
2004/0163487 A1 8/2004 Martus et al.
2014/0173985 A1 * 6/2014 Alsadah .................. E05F 15/40 49/31
2016/0145910 A1 * 5/2016 Beck ....................... E05B 81/86 292/336.3
2016/0305164 A1 10/2016 Bendel
2016/0333614 A1 11/2016 Bendel

FOREIGN PATENT DOCUMENTS

CN 107130856 A 9/2017
DE 102007002700 A1 7/2008
DE 102013112122 A1 5/2015
DE 102014112887 A1 3/2016
DE 102015108269 A1 12/2016
EP 1449992 A2 8/2004
WO WO-2018024405 A1 * 2/2018 ......... E05B 47/0009

OTHER PUBLICATIONS

PCT, International Search Report and Written Opinion, International Application No. PCT/US2020/013268; dated Apr. 14, 2020, 10 pages.

* cited by examiner

ACTUATING DEVICE FOR A LOCK OF A VEHICLE, AND VEHICLE DOOR AND VEHICLE HAVING SAID VEHICLE DOOR

TECHNICAL FIELD

The present invention relates to an actuating device for a lock of a vehicle. The invention further relates to a vehicle door having such an actuating device and to a vehicle having such a vehicle door.

BACKGROUND

By way of example, it may be possible, in the event of an accident, for locks on a vehicle, for example the lock of a vehicle door (including the trunk lid), to be locked and/or for the unlocking mechanism of the lock to be disrupted. The vehicle interior is thus not easily accessible to people (for example rescuers) located outside the vehicle. As a result, rescuers are unable to retrieve a person located in the vehicle, or a considerable time delay arises during the retrieval operation.

Therefore, for such cases, emergency or redundant actuating devices are provided on the vehicle, with which the corresponding vehicle door can be opened.

Known here are emergency devices in which a cover, which first of all has to be removed, allows access to traction means with which it is possible to open the door (for example DE 10 2014 112 887 A1).

However, the known emergency devices have a drawback in that it is often tricky to release and actuate them. Thus, for example, it is first of all necessary to remove a cover, without which esthetic requirements placed on the vehicle might not be satisfied. It is also necessary for the rescuer to be at least roughly familiar with the mechanism of the emergency device and know that the cover needs to be removed and allows access to devices for opening the vehicle.

SUMMARY

Therefore, the problem addressed by the present invention is to specify an actuating device that remedies the drawbacks of the known emergency devices. In particular, the problem addressed by the present invention is to specify an actuating device in which intuitive and rapid opening of the vehicle is possible without any familiarity with the mechanism of the actuating device.

The solution according to the invention consists in specifying an actuating device for a lock of a vehicle, which is arranged, or can be arranged, on a vehicle, wherein the actuating device has an actuating component, which is to be grasped manually and which can be brought from a stowed position into a standby position, wherein the stowed position is a position in which the actuating component to be grasped is stowed, and wherein the standby position is a position in which the actuating component can be grasped by a user, wherein the actuating component is operatively connected, or can be operatively connected, to at least the lock of the vehicle in such a way that the lock can be opened by actuating the actuating component.

The (manual) actuating device according to the invention solves the problem in a satisfactory manner. In particular, it is possible, by means of the actuating device, to allow intuitive and rapid opening of the vehicle without any familiarity with the mechanism of the actuating device.

Preferably, the lock of the vehicle is the lock of a vehicle door (including the trunk lid) of the vehicle. The vehicle is a mobile means of transport, for example a land vehicle, watercraft or aircraft, preferably a land vehicle (rail vehicle, road vehicle, all-terrain vehicle) and particularly preferably a passenger car.

The stowed position is understood to be a position in which the actuating component is at least partially, preferably entirely, stowed in the actuating device or an element (for example housing) thereof. In this stowed position, the actuating component is thus preferably not able to be grasped by a user. For example, in the stowed position, the actuating component is at least largely recessed into a groove and/or the housing of the actuating device. When in use or in an emergency, the actuating component is able to be brought out of the stowed position into a use position or standby position.

The actuating component is preferably coupled to a Bowden cable, which is operatively connected to the lock (for example the door catch), or has a corresponding coupling portion for a Bowden cable. A Bowden cable is in this case understood to be a movable mechanical element for transmitting a mechanical movement and compressive and tensile forces by means of a flexible combination of a wire cable and a sheath that is pressure resistant in its direction of extension.

The actuating device is preferably arranged on the vehicle such that the actuating component located in the stowed position is concealed, and specifically is preferably not visible to a person with a height of at least 1.60 m who is standing next to the vehicle. For example, the actuating device is arranged on the underside of a trunk lid protrusion or on a side door on the rear side, accessible via an adjacent depression, of a door outer surface.

However, when it has been moved into the standby position, the actuating component is visible, and specifically preferably for a person with a height of at least 1.60 m who is standing next to the vehicle.

Thus, an actuating device can be achieved that allows a rescuer to have intuitive and rapid access to the vehicle in an emergency.

According to an advantageous development of the invention, the actuating component has a flexible force-transmission element, in particular in the form of a flexible tube or in the form of a cable or band portion.

In this case, the flexible force-transmission element is the portion of the actuating component that can be grasped by the user.

Preferably, the actuating component (particularly preferably the flexible force-transmission element, for example the flexible tube or the cable or band portion) is at least partially colored in a signal color. A signal color is a conspicuous color (bright red, bright yellow) that has a signal effect and frequently serves specifically as a warning signal. In particular, the signal color can be a neon signal color. In this case, it is also possible for a color contrast with the external color of the vehicle to be used in order to enhance the effect. With the combination of two strongly contrasting colors (for example red actuating component on a white car), clear perceptibility (even at relatively large distances) is achieved.

According to an advantageous development of the invention, the actuating device further has a housing, wherein the actuating component, in a first portion, is mounted on the housing of the actuating device via a prismatic joint, wherein the actuating component is preferably designed to be moved between the stowed position and the standby position, namely preferably from the stowed position into the standby position and back, by displacing the actuating component along the degree of freedom enabled by the prismatic joint.

With such a structure, simple and especially reliable provision of the actuating component is possible. Preferably, the actuating component is clamped in place or pivotably mounted in a second portion, preferably on a housing of the actuating device.

According to an advantageous development of the invention, the actuating component has a rigid (stable), linear portion, which preferably has a circular or angular cross section and is guided in the prismatic joint.

This makes it easier to return the actuating component from the standby position into the stowed position by pushing this linear stable portion in. Since the actuating component consists at least partially (for example flexible tube) of a flexible material, it is easier to manually return the actuating component into the stowed position.

According to an advantageous development of the invention, the actuating device has a groove, in which the actuating component is recessed, at least for the most part, in its stowed position.

The groove has the simple effect that the actuating component is stowed so as not to be visible. In this respect, it preferably terminates substantially flush with the edge of the groove or is recessed even further. Preferably, in the stowed position, the actuating component (for example the flexible tube or cable or band portion thereof) is positioned substantially and largely parallel to the surface of the actuating device, for example the groove bottom.

Preferably, one or both groove flanks of the groove have a recess or depression, which makes it possible to introduce a finger or elongate object—for example a vehicle key—between the groove bottom and the actuating component when the actuating component is in the stowed position. As a result, the actuating component can also be pulled out manually.

According to an advantageous development of the invention, the actuating component, in the standby position, assumes a graspable form, preferably forms a bulge, particularly preferably a loop.

In the standby position, the actuating component is able to be grasped by a user in order to make it possible for the latter, by actuating the actuating component (for example pulling), to open the lock. Preferably, the actuating component, together with the surface of the actuating device, forms the graspable form.

Preferably, the graspable form (for example loop) has at least a diameter of 1 cm, preferably 2 cm at the point of the largest opening.

Preferably, the flexible force-transmission element forms the loop. As a result, one or more fingers can engage in the loop.

Preferably, in the standby position, the actuating component bulges at least partially (for example out of the groove) from the surface of the actuating device such that it forms a loop.

According to an advantageous development of the invention, the actuating device has a spring element, which preloads the actuating component in the direction of the standby position when it is in the stowed position.

As a result of the preload, it is possible to reliably move the actuating component into the standby position when the spring element is relaxed.

According to an advantageous development of the invention, the actuating device has a releasable latch device, which is designed to latch the actuating component in the stowed position, wherein the latch device preferably has at least two latching elements which can be brought into mutual latching engagement, wherein the actuating device particularly preferably has an actuator, which is designed to release the latching device.

When the latch elements are in latching engagement, it is possible for example for the spring element to be held in its preloading position, which is undone, when the latching engagement is released, by relaxing the spring element (this is associated with a movement of the actuating component from the stowed position into the standby position).

The spring is preferably designed to move the actuating component in the direction of the standby position by way of stored spring energy to such an extent that the actuating component becomes visible to the user and/or can at least be grasped with one or more fingers and be pulled out further.

For example, one of the latch elements can be retracted actively out of latching engagement. As a result, automatic presentation of the actuating component is able to be effected for example by means of a signal—for example in the event of a crash.

Preferably, one of the latch elements is arranged on the actuating component, preferably the rigid, linear portion, and the other of the latch elements is arranged preferably on the housing, preferably on the prismatic joint.

According to an advantageous development of the invention, the actuating device has a pressure surface and/or tension surface, via which the latching device is released accordingly via pressure or tension.

Thus, if a predefined pressure or tension is exceeded, the latching device can—accordingly—be released (for example also by means of an actuator). As a result, emergency actuation is initiated intuitively or proposed by the user, since then the actuating component is moved into the standby position. This is useful for example in panic situations.

In this case, it is advantageously conceivable for the pressure surface and/or tension surface to be a visible region of a door handle (at least partially). In a panic situation, in which for example a rescuer intuitively pulls "strongly" on the door handle, it is thus possible for the actuating component (in a field of vision of the rescuer) to be provided (standby position).

According to an advantageous development of the invention, the housing has two mutually relatively movable housing parts, wherein one housing part has a guide portion for the actuating component as part of the prismatic joint and the other housing part has one of the latching elements, and wherein, via the relative movement of the housing parts, the latching element is designed to move away from the guide portion to such an extent that the latching engagement with the other of the latching elements is released when the actuating component is located in the stowed position.

Thus, starting from a relative movement, which creates an increased distance d1 between the two housing parts, the latching engagement can be released such that the actuating component can move from the stowed position into the standby position or at least becomes visible to the user and can be grasped with one or more fingers and can be pulled out further.

According to an advantageous development of the invention, the actuating device is designed to convert a pressure or tension exerted on the pressure surface and/or tension surface into the relative movement, wherein the actuating device preferably has a spring element, which is designed to act against the relative movement.

The spring element, which is designed to act against the relative movement, can be for example a catch spring, but for example foam rubber is also conceivable. As a result, the relative movement reaches the point at which the latching device releases only at a particular pressure or tension threshold.

On account of its characteristic—which is initially very stiff, and thus presents a high opposing force, and then smoother after the overcoming of a threshold—the catch spring is preferred, since it allows a better haptic separation of normal actuation and emergency actuation. This is also advantageous in particular when the pressure surface and/or tension surface is a visible region of a door handle.

According to an advantageous development of the invention, the actuating component is designed, at least in part, as a light-conducting and/or light-diffusing body, wherein the actuating component preferably has a light source or such a light source is arranged on the actuating component, which is particularly preferably designed such that it couples light into the light-conducting and/or light-diffusing body at one or more points.

Preferably, the actuating device and/or the vehicle is set up to control the light source by means of a control unit and thus to illuminate the actuating component at least when it is in the standby position, and preferably also in the stowed position.

Overall, it is possible in this way to achieve a further improvement in the actuating device, since the latter can be identified even better—in particular in the dark—by a user.

Preferably, the flexible force-transmission element is designed as such a light-conducting and/or light-diffusing body.

The actuating device according to the invention serves in particular for the emergency actuation of a vehicle door. Since the actuating device does not need to be configured for the primary actuation of a vehicle door, the components of the actuating device can be designed to be smaller and lighter, since they do not have to be envisioned for continuous use. This in turn has the advantage that the available space to be provided in or on the vehicle door for the installation of the actuating device can be reduced.

In this case, it should be borne in mind that the actuating device according to the invention can be embodied as an external system for emergency actuation of a vehicle door from the outside or as an internal system for emergency actuation of a vehicle door from the inside.

Specifically in the context of the increasing electrification in the automotive sector, appropriate measures should be provided in order for it to be possible to manually actuate particular basic functions in the event of failure of electrical or electronic components of the vehicle.

As an example of this, vehicle doors that open and close electrically may be mentioned. In order to be able to open from the inside such vehicle doors even in the event of a fault in or failure of the electrical actuators used for opening/closing, the actuating device according to the invention for emergency actuation is suitable. In this connection, it is conceivable that, in the event of a fault in or failure of the vehicle electrics, the actuating component of the actuating device is automatically provided, i.e. transferred into its standby position Furthermore, the solution according to the invention consists in specifying a vehicle door having one of the above-described actuating devices.

With the vehicle door according to the invention, the problem is solved in a satisfactory manner. In particular, it is possible with such a vehicle door to allow intuitive and rapid opening of the vehicle.

Furthermore, the solution according to the invention consists in specifying a vehicle having such a vehicle door.

With the vehicle according to the invention, the problem is solved in a satisfactory manner. In particular, intuitive and rapid opening of the vehicle is possible.

The above aspects and advantages, which were discussed in connection with the individual actuating devices, also apply in a corresponding manner to the vehicle door and the vehicle.

BRIEF DESCRIPTION OF THE DRAWINGS

The invention is explained in more detail below by way of the description of exemplary embodiments with reference to the accompanying drawings.

In the drawings.

DETAILED DESCRIPTION

Figure 1:
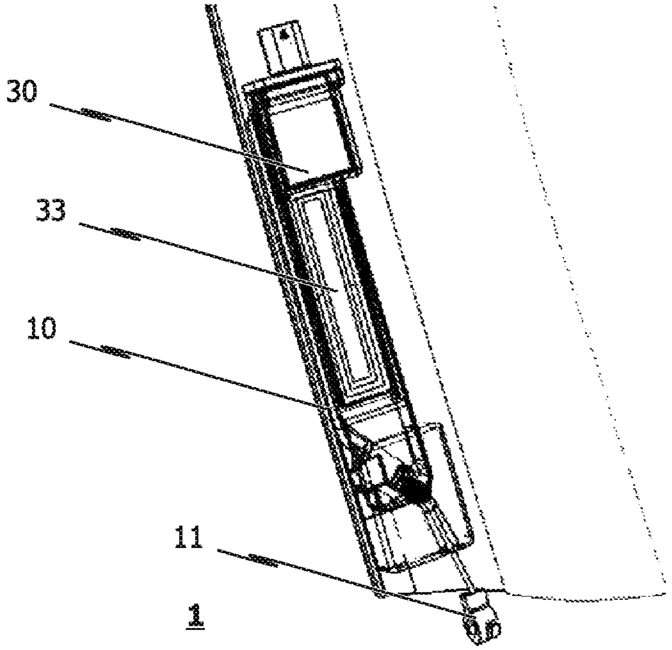
FIG. 1 shows a schematic illustration of the actuating device in a state fitted on a vehicle but not released.
Figure 3:
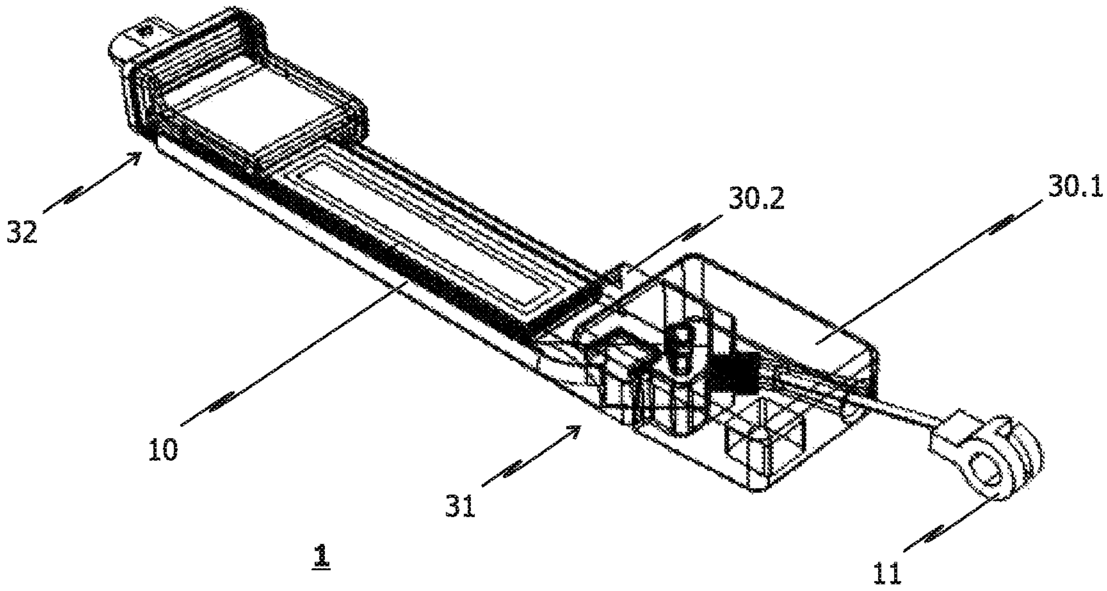
FIG. 3 shows a schematic illustration of the actuating device in an unreleased state.

FIG. 1 shows a schematic illustration of an actuating device 1 in a state fitted on a vehicle but not released, and FIG. 3 shows a schematic illustration of the actuating device 1 in a state not fitted on a vehicle. An unreleased state is understood to be a state in which an actuating component 10 is in its stowed position.

As can be seen in FIG. 1, the actuating component 10, in the stowed position, is stowed in the actuating device 1 or in a housing 30 thereof.

The actuating device 1 is arranged on the vehicle such that the actuating component 1 located in the stowed position is concealed. This means that it is not visible to a person with a height of at least 1.60 m who is standing next to the vehicle. In this case, the actuating device 1 is arranged on a side door on the rear side of a door outer surface.

As can furthermore be seen in FIG. 1 and FIG. 3, the actuating device 1 has a coupling portion 11, which is able to be coupled for example with a Bowden cable such that a door lock of the door can be opened manually.

The actuating device 1 has a pressure and/or tension surface 33, on which a user can exert pressure or tension, wherein, if a predetermined pressure or tension is exceeded, the actuating component 10 is transferred into its standby position. This standby position is shown in FIG. 2 and FIG. 4.

Figure 2:
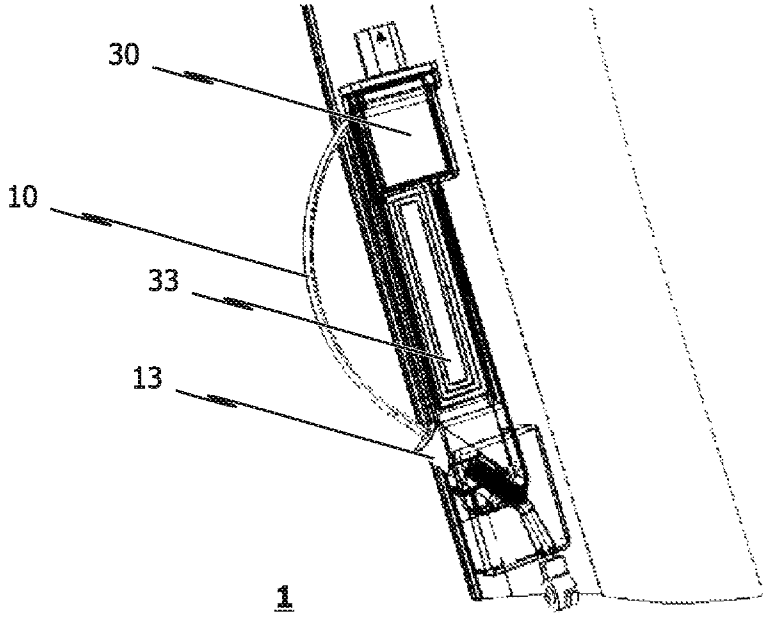
FIG. 2 shows a schematic illustration of the actuating device in a state fitted on the vehicle and released.
Figure 4:
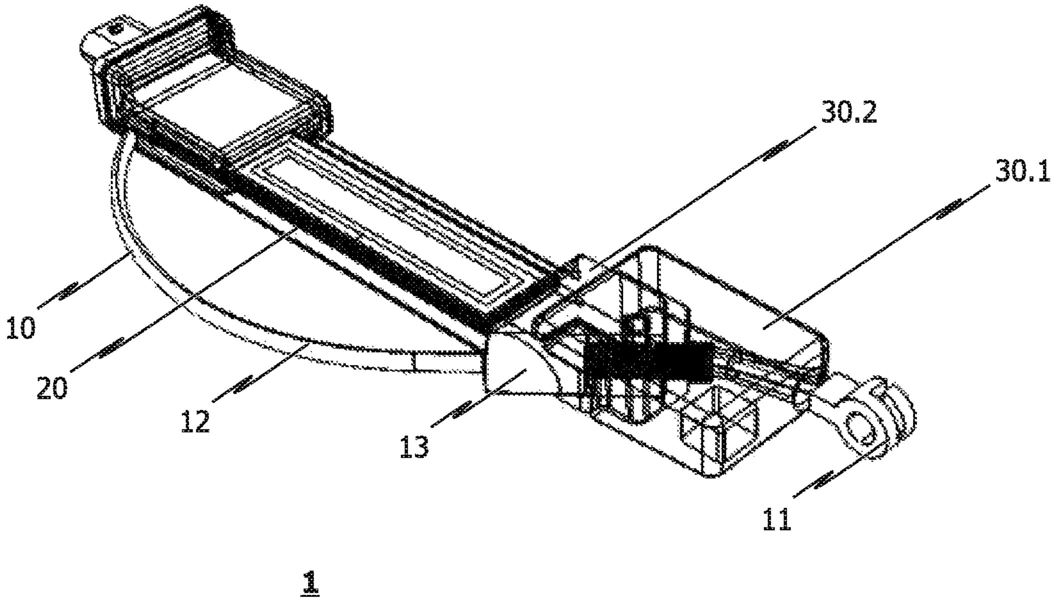
FIG. 4 shows a schematic illustration of the actuating device in a released state.

Thus, FIG. 2 and FIG. 4 show the actuating device 1 in a released state, in which the actuating component 10 is graspable by a user. Thus, when it has been moved into the standby position, the actuating component 10 is visible to a user. In particular, it is visible to a person with a height of at least 1.60 m who is standing next to the vehicle.

It is clearly apparent from FIGS. 2 and 4 that the actuating component 10 is no longer arranged in a groove 20 in the housing 30, but protrudes therefrom and as a result is graspable by a user. It is also apparent that the actuating component 10 forms a loop, in which one or more fingers can engage. This loop arises in particular in that the actuating component 10, in the standby position, bulges at least partially out of the groove 20 from the surface of the actuating device 1.

The movement of the actuating component 10 is provided by a prismatic joint 31 and a pivot bearing 32, the positions of which are shown in FIG. 3.

Thus, the actuating component 10 is mounted on the housing 30 of the actuating device 1 in a first portion (here in a linear portion 13) via the prismatic joint 31. The actuating component 10 is displaceable between the stowed position and the standby position along the degree of freedom allowed by the prismatic joint 31.

In a second portion, which is arranged at an opposite end from the first portion, the actuating component 10 is mounted in a pivotable manner on the housing 30 of the actuating device 1.

The first portion is illustrated in FIG. 4 as a rigid, linear portion 13 and has a round cross section. This linear portion 13 is guided in the prismatic joint 31, wherein the prismatic joint 31 is in this case a bore with a corresponding diameter.

As is also illustrated in FIG. 4, the actuating component 10 has a flexible force-transmission element 12, at which the actuating component 10 is graspable. This is preferably illuminated and/or embodied in a signal color in order to draw the attention of a user (rescuer) thereto. Overall, a corresponding presentation can cause the latter to intuitively recognize and use the actuating component 10.

The actuating component 10 is transferred from the stowed position into the standby position for example automatically by means of an actuator when an impact is identified (by sensors). Furthermore, a corresponding signal can also be provided via the pressure and/or tension surface 33.

Figure 5:
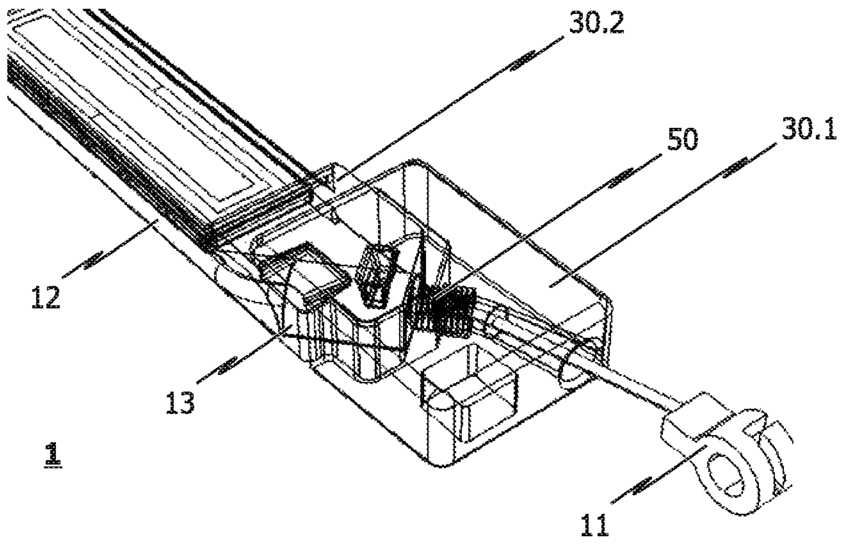
FIG. 5 shows an enlarged view of a region of the actuating device in an unreleased state.
Figure 6:
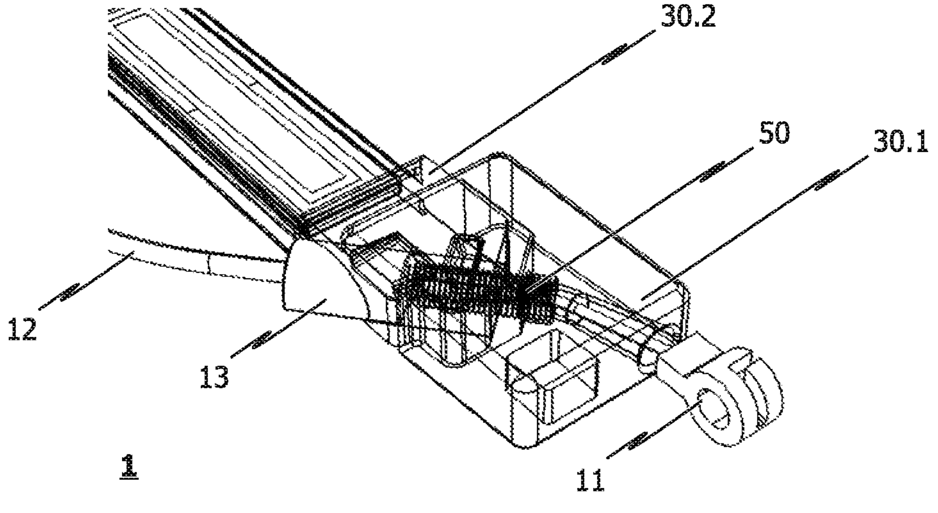
FIG. 6 shows an enlarged view of a region of the actuating device in a released state.

FIG. 5 shows an enlarged view of a region of the actuating device 1 in an unreleased state, and FIG. 6 shows the corresponding enlarged view in a released state. In FIGS. 5 and 6, in particular the preloading mechanism of the actuating device 1 is illustrated more clearly.

For this purpose, the actuating device 1 has a spring element 50, which preloads the actuating component 10, when it is in the stowed position, in the direction of the standby position. If the actuating device 1 is activated (actuator, pressure and/or tension surface), when the spring element 50 relaxes, the actuating component 10 is moved into the standby position.

Figure 7:
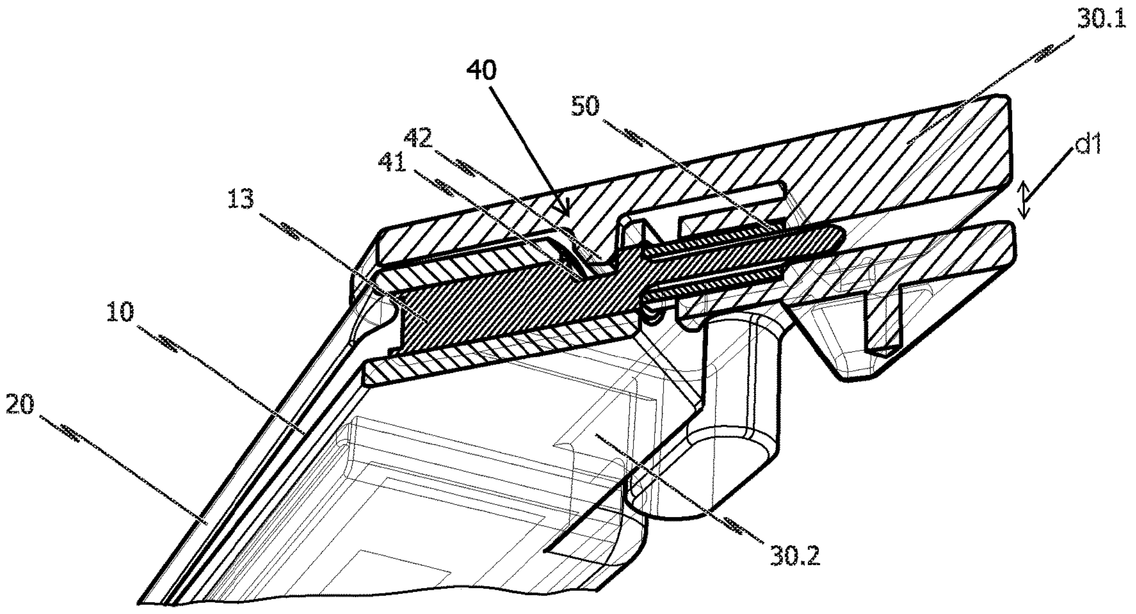
FIG. 7 shows a further enlarged view of a region of the actuating device, which shows the releasable latching device in an engaged state.
Figure 8:
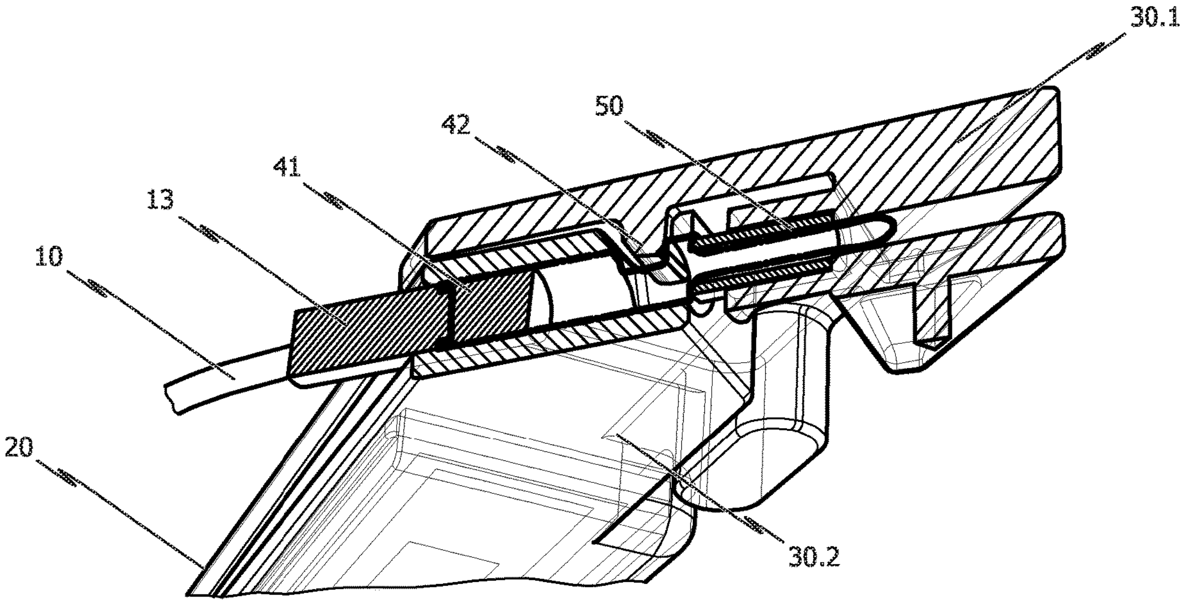
FIG. 8 shows a further enlarged view of a region of the actuating device, which shows the releasable latching device in an unengaged state.

For this purpose, the actuating device has the releasable latching device 40 illustrated in FIGS. 7 and 8. The latching device 40 is designed such that the actuating component 10 is latched in the stowed position, i.e. can be held in this position. In this case, the latching device 40 has two latch elements 41 and 42 that are able to be brought into mutual latching engagement.

When the latch elements 41 and 42 are in latching engagement, the spring element 50 can be held in its preloading position. When the latching engagement is released, the spring element 50 can relax, wherein the actuating component 10 is moved from the stowed position into the standby position in a manner driven thereby.

One latch element 41 of the latch elements 41, 42 is arranged on the actuating component 10, more specifically on the linear portion 13. The other latch element 42 of the latch elements 41, 42 is arranged on the housing 30, more specifically in a region of the prismatic joint 31.

In this case, the other latch element 42 belongs to the movable housing part 30.1. During a mutual relative movement of the housing parts 30.1 and 30.2, the latch element 42 is designed and arranged such that it is removed from the housing part 30.1 to such an extent that the latching engagement with the latch element 41 is released.

In this way, a simple, reliable presentation of the actuating component 10 can occur, with the result that the actuating component 10 can be grasped intuitively by a rescuer and is actuated (for example by traction) such that the rescuer has access to the vehicle.

LIST OF REFERENCE SIGNS

1 Actuating device
10 Actuating component
11 Coupling portion
12 Flexible force-transmission element
13 Linear portion
20 Groove
30 Housing
30.1 Movable housing part
30.2 Movable housing part
31 Prismatic joint
32 Pivot bearing
33 Pressure and/or tension surface
40 Releasable latching device
41 Latch element
42 Latch element
50 Spring element

The invention claimed is:

1. An actuating device for a lock of a vehicle, which is arranged, or can be arranged, on a vehicle, wherein the actuating device has an actuating component, which is to be grasped manually and which can be brought from a stowed position into a standby position, wherein the stowed position is a position in which the actuating component is stowed and is not able to be grasped by a user, and wherein the standby position is a position in which the actuating component can be grasped by a user, wherein the actuating component is operatively connected, or can be operatively connected, to at least the lock of the vehicle in such a way that the lock can be opened by manually actuating the actuating component when in the standby position;

wherein the actuating component comprises a flexible force-transmission element in the form of a flexible tube or a cable or band portion, wherein, in the stowed position, the flexible tube or cable or band portion is stowed and not able to be grasped by a user, wherein, in the standby position, the flexible tube or cable or band portion is exposed and forms a flexible loop that is able to be directly grasped by a user.

2. The actuating device as claimed in claim 1, wherein the actuating device further has a housing, wherein the actuating component, in a first portion, is mounted on the housing of the actuating device via a prismatic joint, wherein the actuating component is designed to be moved between the stowed position and the standby position, namely from the stowed position into the standby position, by displacing the actuating component along the degree of freedom enabled by the prismatic joint.

3. The actuating device as claimed in claim 2, wherein the actuating component has a rigid, linear portion, which has a circular or angular cross section and is guided in the prismatic joint.

4. The actuating device as claimed in claim 2, wherein the actuating device has a releasable latch device, which is designed to latch the actuating component in the stowed position, wherein the latch device has at least two latching elements which can be brought into mutual latching engagement, wherein the actuating device has an actuator, which is designed to release the latching device.

5. The actuating device as claimed in claim 4, wherein the actuating device has a pressure surface and/or tension surface, via which the latching device is released accordingly via pressure or tension.

6. The actuating device as claimed in claim 5, wherein the housing has two mutually relatively movable housing parts, wherein one housing part has a guide portion for the actuating component as part of the prismatic joint and the other housing part has one of the latching elements, and wherein, via the relative movement of the housing parts, the latching element is designed to move away from the guide portion to such an extent that the latching engagement with the other of the latching elements is released when the actuating component is located in the stowed position.

7. The actuating device as claimed in claim 6, wherein the actuating device is designed to convert a pressure or tension exerted on the pressure surface and/or tension surface into the relative movement and wherein the actuating device has a spring element, which is designed to act against the relative movement.

8. The actuating device as claimed in claim 1, wherein the actuating device has a groove, in which the actuating component is recessed, at least for the most part, in its stowed position.

9. The actuating device as claimed in claim 1, wherein the actuating device has a spring element, which preloads the actuating component in the direction of the standby position when it is in the stowed position.

10. The actuating device as claimed in claim 1 wherein the actuating component is designed, at least in part, as a light-conducting and/or light-diffusing body, wherein the actuating component has a light source or such a light source is arranged on the actuating component, which is designed such that it couples light into the light-conducting and/or light-diffusing body at one or more points.

11. A vehicle door having an actuating device as claimed in claim 1.

12. A vehicle having a vehicle door as claimed in claim 11.

13. An actuating device for a lock of a vehicle, which is arranged, or can be arranged, on a vehicle, wherein the actuating device has an actuating component, which is to be grasped manually and which can be brought from a stowed position into a standby position, wherein the stowed position is a position in which the actuating component is stowed, and wherein the standby position is a position in which the actuating component can be grasped by a user, wherein the actuating component is operatively connected, or can be operatively connected, to at least the lock of the vehicle in such a way that the lock can be opened by actuating the actuating component;

wherein the actuating device has a spring element, which preloads the actuating component, when in the stowed position, in a direction of the standby position, wherein the housing has first and second housing parts that are relatively movable for adjusting a distance between the first and second housing parts in order to enable the spring element to move the actuating component to the standby position.

14. The actuating device as claimed in claim 13, wherein the actuating component has a flexible force-transmission element in the form of a flexible tube or a cable or band portion.

15. The actuating device as claimed in claim 13, wherein the actuating component, in the standby position, assumes a graspable form of a loop.

16. The actuating device of claim 13, wherein the spring device is configured to move the actuating component linearly out of the housing.

17. An actuating device for a lock of a vehicle, which is arranged, or can be arranged, on a vehicle, wherein the actuating device has an actuating component, which is to be grasped manually and which can be brought from a stowed position into a standby position, wherein the stowed position is a position in which the actuating component is stowed, and wherein the standby position is a position in which the actuating component can be grasped by a user, wherein the actuating component is operatively connected, or can be operatively connected, to at least the lock of the vehicle in such a way that the lock can be opened by actuating the actuating component;

wherein the actuating device includes a releasable latch device configured to releasably latch the actuating component in the stowed position;

wherein the housing has first and second housing parts that are relatively movable for adjusting a distance between the first and second housing parts in order to release the releasable latch device.

* * * * *